UNITED STATES PATENT OFFICE.

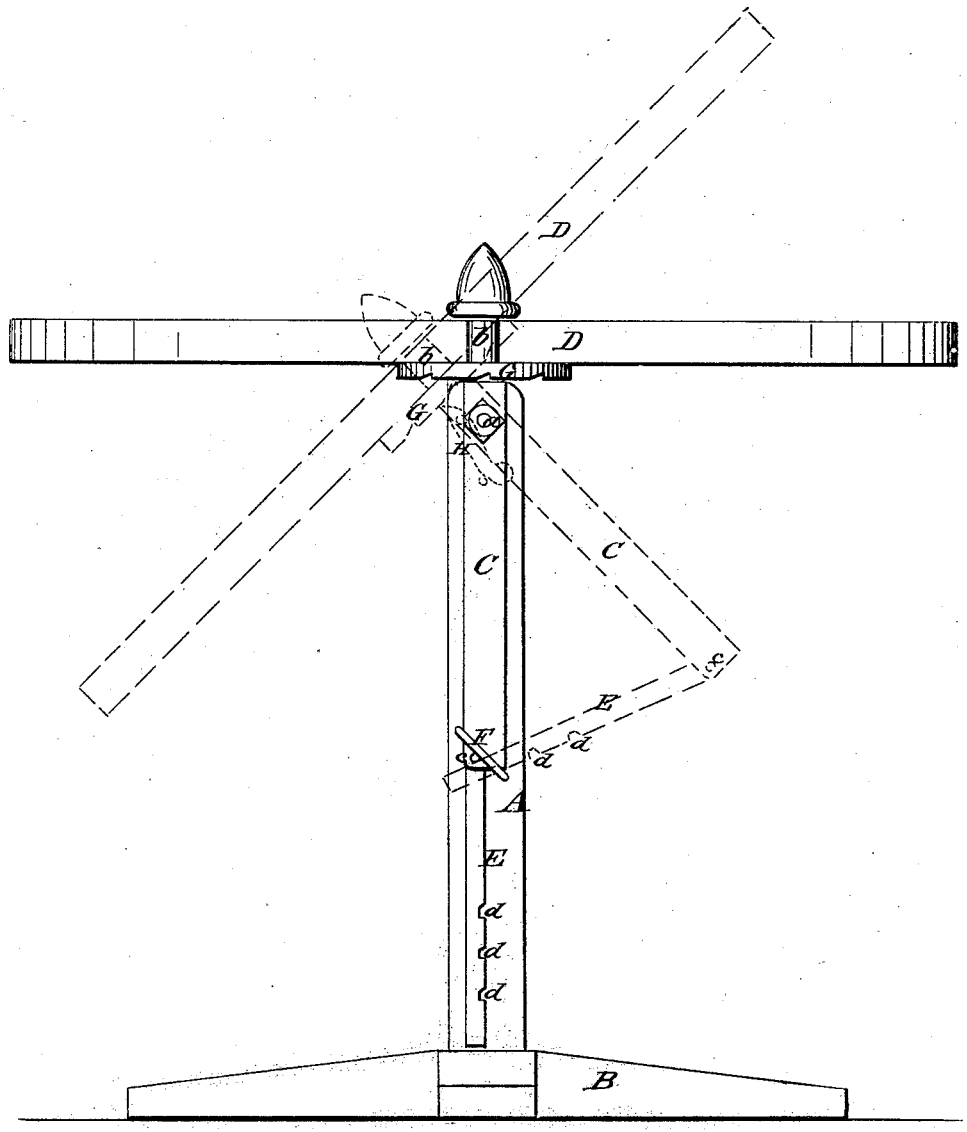
S. Morrill,
Clothes Drier.
Nº 16,065.   Patented Nov. 11, 1856.

SAML. MORRILL, OF ANDOVER, NEW HAMPSHIRE.

CLOTHES-DRIER.

Specification forming part of Letters Patent No. 16,065, dated November 11, 1856; Reissued September 27, 1859, No. 830.

*To all whom it may concern:*

Be it known that I, SAMUEL MORRILL, of Andover, in the county of Merrimack and State of New Hampshire, have invented a new and Improved Clothes-Drying Machine; and I do hereby declare that the following is a full, clear, and exact description of the same, reference being had to the annexed drawing, making a part of this specification, said drawing being an elevation of my improvement.

The nature of my invention consists in attaching the reel to which the clothes are secured to an upright post in such a way that the reel may be tilted or inclined for the purpose of allowing the clothes to be readily secured upon and taken from the reel.

To enable those skilled in the art to fully understand and construct my invention, I will proceed to describe it.

A represents a vertical post the lower end of which is secured to a proper base B, or the post may be sunk in the ground.

C, is an arm which is attached by a bolt or pivot (a), to one side of the post A, the arm being allowed to turn on the bolt or pivot (a). To the upper end of the arm C, there is attached a journal or rod (b), on which a reel D, is fitted. The reel D, is of the usual construction, and is supplied with cords, on which the clothes are secured, the same as in ordinary clothes drying machines. The reel is allowed to turn on the journal or rod (b). The lower end of the arm C, has a bar E, attached to it by a pivot (c). The bar E, has notches (d), made in it and the bar E, is fitted or works through a loop F, attached to the post A.

To the inner side of the reel D, at its center, there is attached a ratchet G, and on one side of the upper end of the post A, there is attached a pawl H, see dotted lines, which catches into the ratchet when the reel D, is tilted, and prevents the reel from turning.

When the clothes are to be secured on the reel, the bar E, is raised up by hand in nearly a horizontal position, and the arm C, is turned on the bolt or pivot (a), and the reel D, is consequently tilted, or brought in a vertical position, or approximating to a vertical position, and while in this position the reel is prevented from turning in one direction by the pawl H, which catches into the ratchet G. The clothes are then secured to the cords on the reel, and the reel is then turned back in a horizontal position. The object in arranging the reel so that it may be tilted is to facilitate the placing or securing of the clothes upon the reel, and also the removal of the clothes therefrom.

I do not confine myself to any precise mechanical means for tilting the reel, for various modifications of the plan herein shown may be used.

Having thus described my invention, what I claim as new and desire to secure by Letters Patent, is—

Arranging the ratchet on the under side of the reel in combination with the pawl H, and lever C, in such a manner that the pawl and ratchet are brought into play when the reel is tilted, but thrown out of play when in its horizontal position, substantially as described and for the purpose set forth.

SAMUEL MORRILL.

Witnesses:
NEHEMIAH EMERSON,
JOHN LEAVITT,
E. A. F. HAMMOND.